United States Patent [19]

Yoshitsugu et al.

[11] 4,213,651
[45] Jul. 22, 1980

[54] SEATBELT SYSTEM

[75] Inventors: Noritada Yoshitsugu; Masanao Motonami; Mitsuaki Katsuno, all of Toyota, Japan

[73] Assignees: Toyota Jidosha Kogyo Kabushiki Kaisha; Kabushiki Kaisha Tokai Rika Denki Seisakusho, both of Aichi, Japan

[21] Appl. No.: 875

[22] Filed: Jan. 4, 1979

[30] Foreign Application Priority Data

Mar. 24, 1978 [JP] Japan .................................. 53-38185

[51] Int. Cl.² ............................................. A62B 35/00
[52] U.S. Cl. .................................... 297/475; 280/807
[58] Field of Search ............... 297/388, 385, 476, 478, 297/475; 280/803, 807

[56] References Cited

U.S. PATENT DOCUMENTS

| 3,306,552 | 2/1967 | Nakolan | 297/388 X |
| 3,929,205 | 12/1975 | Takada | 297/388 X |
| 4,109,962 | 8/1978 | Magyar | 297/388 X |
| 4,118,068 | 10/1978 | Föhl | 297/385 |

FOREIGN PATENT DOCUMENTS

| 1372712 | 11/1974 | United Kingdom | 297/388 |
| 1434676 | 5/1976 | United Kingdom | 297/388 |

Primary Examiner—James T. McCall
Attorney, Agent, or Firm—Koda and Androlia

[57] ABSTRACT

A seatbelt for a vehicle including a retractor provided adjacent one side and on a forward underside of a passenger seat. The retractor is arranged and configured such that a seatbelt extending from the retractor extends diagonally across the underside of the seat to a point on the seat opposite from the side on which the retractor is provided.

8 Claims, 4 Drawing Figures

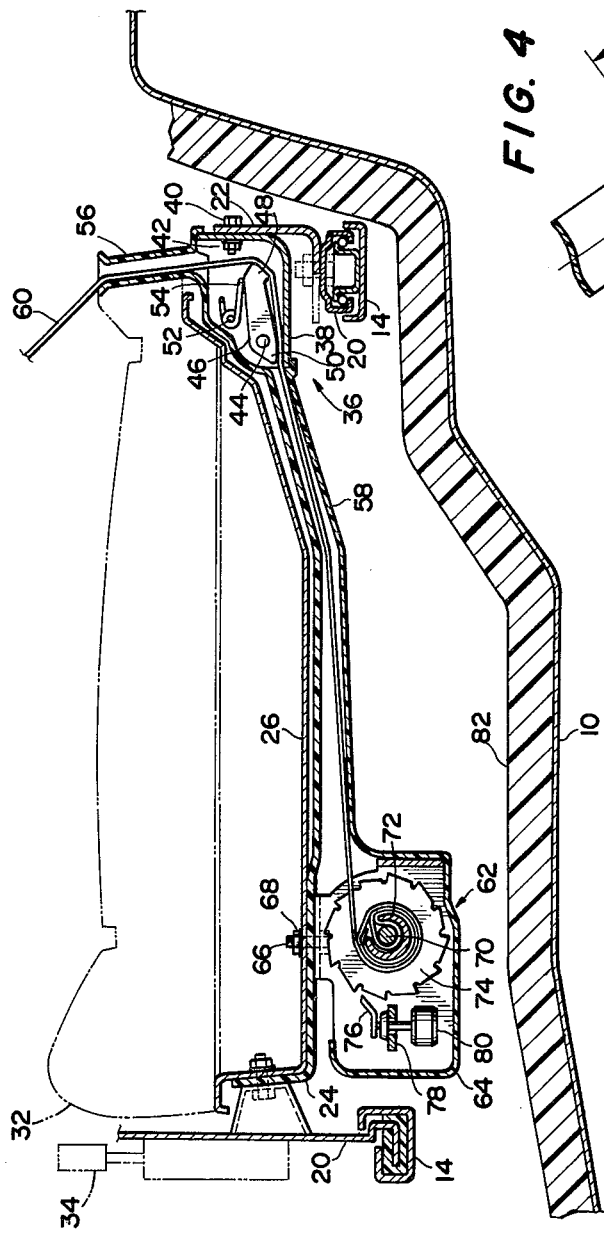

SEATBELT SYSTEM

BACKGROUND OF THE INVENTION

1. Field of the Invention

This invention relates to seatbelt systems which restrain and protect passengers during vehicular emergencies and more specifically to seatbelt systems in which one end of the passenger restraining seatbelt is fastened to the passenger seat.

2. Prior Art

Generally, seatbelt systems are designed such that one end of the passenger restraining seatbelt is power retracted on a retractor fastened to the vehicle so that a specified tension is placed on an intermediate portion of the seatbelt. As a result, the seatbelt is caused to adhere closely to passenger. Furthermore, when the seatbelt is not in use, it is power retracted and stored inside the retractor. In addition, during a vehicular emergency, the extension of the seatbelt is abruptly stopped by an inertial locking mechanism provided inside the retractor. As a result, tension on the seatbelt generated by the movement of the passenger in the direction of impact is transmitted to the vehicle via the retractor and the passenger is securely restrained so that his safety is insured.

In case where the retractor is fastened to the vehicle, however, since the position in which the passenger rides in the vehicle changes according to the adjustment of the position of the passenger relative to the seatbelt system changes, the performance of the seatbelt system varies according to the adjustment of the position of the passenger seat. As a result, it becomes necessary to adjust position in which the seatbelt is fastened. Recently, passive seatbelt systems have been proposed which are able to automatically fasten the seatbelt around the passenger after the passenger has seated himself in the passenger seat. In cases where such systems are used, it is necessary to fasten a retractor to the passenger seat so that the passenger is constantly kept in an appropriate restrained condition. However, in cases where a retractor is fastened to the rear of the passenger seat, the retractor interferes with the leg room of the passengers seated in the rear seat. Furthermore, a substantial resistance is imparted to the intermediate portion of the seatbelt which extends under the seats so that the retracting force of the retractor is reduced.

SUMMARY OF THE INVENTION

Accordingly, it is a general object of the present invention to provide a seatbelt system which when the seatbelt retractor is fastened to the passenger seat does not interfere with the leg room of the rear seat passengers and does not cause any reduction in force which the seatbelt is retracted.

The objects of the present invention are accomplished by a seatbelt system for a vehicle including a retractor provided adjacent one side and on a forward underside of a passenger seat. The retractor is arranged and configured such that a seatbelt extending from the retractor extends diagonally across the underside of the seat to a side of the seat opposite from the side of the retractor is provided on. The side of the seat to which the seatbelt diagonally extends is further provided with a turning member around which the seatbelt turns. The turning member is positioned such that a turning line of a turned portion of the seatbelt which extends around the turning member is in a horizontal orientation.

BRIEF DESCRIPTION OF THE DRAWINGS

The above mentioned features and objects of the present invention will become more apparent with reference to the following description taken in conjunction with the accompanying drawings, wherein like reference numerals denote like elements and in which:

FIG. 3 is a cross sectional view along the line III—III in FIG. 1; and

FIG. 4 is an unfolded view of the turned portion of the seatbelt.

DETAILED DESCRIPTION OF THE INVENTION

Figure 1:
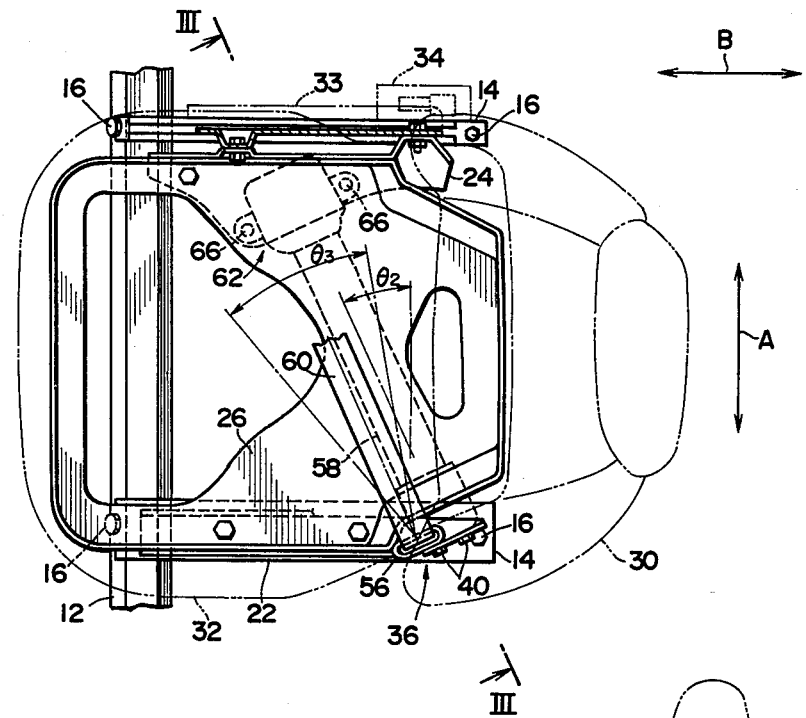
FIG. 1 is a plan view illustrating one embodiment of seatbelt system in accordance with the teachings of the present invention.

Referring more particularly to the drawings, a cross member 12, which is roughly U-shaped in cross section, is fastened to the floor 10 of the vehicle so that it is oriented in the direction of the transverse axis of the vehicle, i.e., in the direction indicated by arrow A. This cross member 12 is used to reinforce the vehicle. The front ends of a pair of lower rails 14 are fastened by means of bolts 16 to the cross member 12 so that an appropriate distance is maintained between the lower rails 14. Furthermore, the rear ends of the lower rails 14 are similarly fastened by means of bolts 16 to a pair of brackets 18 fastened to the floor 10.

Upper rails 20 are installed via appropriate shockabsorbing parts on the lower rails 14 so that the upper rails 20 are free to slide in the direction of the legnth of the vehicle, i.e., in the direction indicated by the arrow B in FIG. 1. Reinforcements 22 and 24 made of steel plate are fastened to the tops of the upper rails 20. A seat frame 26 made from steel plate is fastened to the tops of the reinforcements 22 and 24 thereby connecting together the reinforcements 22 and 24. A seat cushion 32 on which a seat back 30 is mounted upright via seat hinges 28 is provided on the seat frame 26 to form a passenger seat. The above described parts are arranged and configured such that the seated passenger faces toward the front of the vehicle.

A slide adjuster 33 is installed between both sets of upper rails 20 and lower rails 14. The position of the seat cushion 32 relative to the floor 10 in the direction of the length of the vehicle can be changed by adjusting as desired the position of the upper rails 20 relative to the lower rails 14. Furthermore, a seat angle adjuster 34 is installed between the seat back 30 and the seat cushion 32 so that the angle of the seat back 30 can be adjusted.

The frame 38 of a direct locking mechanism 36 is fastened by means of of fastening bolts 40 and nuts 42 to the rear portion of the reinforcement 22. The reinforcement 22 is located on one side of the seat cushion 32, namely, on the left side of the seat as viewed facing in the direction of vechicle travel. An arm 46 is supported so that it can rotate on a pin 44 in the frame 38. One end of the arm 46 acts as a sensor 48. The other end of the arm 46 acts as a pressing part 50 which is shorter than the sensor 48. The force of the torsion coil 54, which is pivot-supported on the frame 38 by means of a small pin 52, acts on the arm 46 so that the sensor 48 is caused to approach the bottom of the frame 30, i.e., so that the pressing part 50 is kept away from the bottom of the frame 38. Furthermore, an upright cover 56 made of plastic is installed on the frame 38 so that the cover 56 slightly inclined toward the front of the vehicle. The lower end of the upright cover 56 connects with a horizontal cover 58. The direct locking mechanism 38 described above is designed so that an intermediate portion of the passenger restraining webbing 60 can be directly clamped and locked. Specifically, one end of the seatbelt 60 extending from the passenger restraining portion of the seatbelt passes through the upright cover 56, turns around the sensor 48 of the arm 46, passes between the pressing part 50 and the frame 38 and is retracted on the retractor 62 fastened to the bottom of the seat near the opposite side of the seat from the turning point of the web of the seatbelt. Accordingly, a slight tension is placed on the seatbelt 60 by the retracting force of the retractor 62. This tension drives the arm 46 in a counterclockwise direction with reference to FIG. 3. However, since this driving force is very weak, enough space remains between the pressing bar 50 and the frame 38 for the seatbelt 60 to pass therethrough. However, when the tension on the seatbelt 60 is increased as a result of the passenger wearing the seatbelt 60 being thrown from the seat due to a vehicular collision, the arm 46 is caused to rotate abruptly in a counterclockwise direction against the force of the torsion coil spring 54. As a result, the seatbelt 60 is clamped and locked between the pressing part 50 and the frame 38 so that the movement of the seatbelt 60 in the direction of the extension of the seatbelt 60 is stopped.

The frame 64 of the retractor 62 is fastened to the bottom of the reinforcement 24 by means of fastening bolts 66 and nuts 68 so that the frame 64 is located in the space between the reinforcement 24 and the floor 10. A retractor shaft 70 and a spool 72, which are integrally connected with each other, are mounted such that they can rotate inside the retractor frame 64. The seatbelt 60 is retracted by the force of a spring (not shown).

A ratchet wheel 74 is fastened to the spool 72. When a pawl 76, which is mounted so that it can pivot on the frame 64, is caused to incline, the ratchet wheel 74 is engaged by the pawl 76 so that the rotation of the retractor 70 in the direction of the seatbelt 60 extension is stopped. Under normal operating conditions, the pawl 76 is kept free of the ratchet 74 by its own weight. However, when a pendulum 80, which is suspended from a bracket 78 fastened to the frame 64, senses vehicle acceleration and therefore swings, the pawl 76 is pushed upward by the pendulum 80 such that it inclines and engages with the ratchet wheel 74.

The following is a description of the turned portion of the seatbelt 60, i.e., the portion of the seatbelt 60 that is in the vicinity of the point where the seatbelt 60 is turned by the direct locking mechanism 36. According to the figures, it is desirable that the line around which the seatbelt 60 is turned be perpendicular to the length of the seatbelt 60 as indicated by the turning line C in FIG. 4. As the turning line is shifted so that it runs diagonally across the webbing at an angle $\theta_1$ with respect to the turning line C (as indicated by the line D), the length of the turning line gradually increases such that the sliding resistance between the seatbelt 60 and the sensor 48 is increased. It is desirable that the turning line C be oriented in a roughly horizontal direction so that the space between the seat cushion 32 and the carpet 82 installed on the floor of the vehicle is very narrow. Accordingly, in order to use this narrow space effectively, it is desirable that the retractor 62 be fastened to the reinforcement 64 so that the axis of the retractor shaft 70 is horizontally oriented. Accordingly, the turning point of the webbing 60 which extends from the horizontally oriented retractor shaft 70 around the sensor 48 of the arm 46 so that the resulting turning line of the seatbelt 60 is horizontal is a means for minimizing the sliding resistance imparted to the seatbelt 60.

Figure 2:
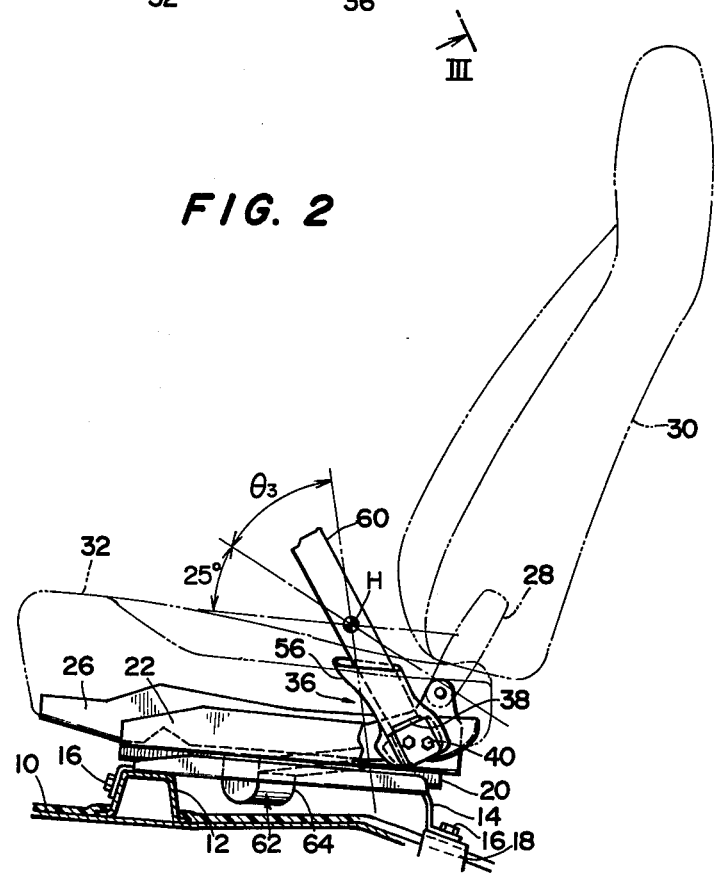
FIG. 2 is a side view of the system of FIG. 1.

Furthermore, it is desirable that the axis of the portion of the seatbelt 60 extending from the retractor 62 to the direct locking mechanism 36 be obliquely oriented with respect to the transverse axis of the vehicle (see angle $\theta_2$ in FIG. 1). This makes it possible for a rear seat passenger to place his feet between the cushion 32 and the floor 10 without interferring with the retractor 62. As a result, the comfort of the rear seat passenger is increased. Furthermore, in order not to impair the comfort of the rear seat passenger, it is desirable that the retractor 62 be installed as far forward in the vehicle as possible. However, if the retractor 62 is installed too far forward, it will hit the cross member 12. Accordingly, the area in which the retractor 62 can be located is limited. However, considering the angle at which the seatbelt 60 rises to meet the passenger restraining portion of the seatbelt, it is desirable that this angle of rise be within the angle $\theta_3$, approximately 50°. As is shown in FIG. 2, this angle $\theta_3$ is centered on the hip point H of the seatbelt 60 extending toward the passenger restraining portion of the seatbelt 60. In order that the seatbelt 60 within this angle may be turned around the sensor 48 of the direct locking mechanism 36 so that the turning line of the seatbelt 60 is maintained in the horizontal orientation, it is desirable that the axis of the portion of the seatbelt 60 extending from the retractor 62 to the direct locking mechanism 36 be installed such that it falls within the angle $\theta_3$ (15° to 45° from the transverse axis of the vehicle) as shown in FIG. 1.

In operation, after the passenger has seated himself on the seat cushion 32, he can put the seatbelt into use by pulling the seatbelt 60 from the upright cover 56 and fastening the seatbelt 60 around himself using a fastening mechanism such as buckle, etc. When the vehicle is invovled in an emergency such as a collision, the passenger is thrown violently forward. As a result, the seatbelt 60 moves abruptly in the direction of extension of retractor 62. Simultaneously, the pendulum 80 senses the acceleration of the vehicle and therefore, abruptly stops the rotation of the retractor shaft 70 and the spool 72 in the direction of the seatbelt extension. As a result, a strong tension is placed on the seatbelt 60. Therefore, the seatbelt 60 actuates the direct locking mechanism 36 such that the seatbelt 60 is clamped between the frame 38 and the pressing part 50 of the arm 46. As a result, the seatbelt 60 is immediately locked such that the passenger is instantaneously securely restrained. Accordingly, the safety of the passenger is insured. Sepcifically, since an intermediate portion of the seatbelt 60 is directly locked, there is no tightening movement of the seatbelt retracted on the retractor 70. Accordingly, the distance of the passenger moves is decreased.

In the above described embodiment, a direct locking mechanism 36 was installed at the turning point of the seatbelt 60 and the seatbelt 60 was turned around the sensor 48 of the direct locking mechanism 36. It should be apparent, however, that it would also be possible to use an ordinary roller-type slip ring, etc., which would turn the intermediate portion of the seatbelt 60 instead of the direct locking mechanism 36 in order to achieve the purpose of this invention.

From the above description, it is apparent that the axis of the portion of the seatbelt 60 turned under the seat is obliquely oriented with respect to the transverse axis of the vehicle. Accordingly, the seatbelt system of the present invention has certain advantages. In particular, in cases where one end of the seatbelt 60 is supported on the front of the passenger seat, sufficient leg room is maintained for rear passengers and there is no reduction in the retracting force applied to the seatbelt 65 by the retractor.

It should be apparent to one skilled in the art that the above described embodiments merely illustrative but a few of the many possible specific embodiments which represent the application of the principles of the present invention. Numerous and varied other arrangements can be readily divised by those skilled in the art without departing from the spirit and scope of the invention.

We claim:

1. A seatbelt system for a vehicle comprising:
   a passenger seat;
   a passenger-restraining seatbelt;
   a belt-turning member which is installed on the rear portion of one side of said passenger seat and around which an intermediate portion of said seatbelt is turned so that said seatbelt is extended underneath said passenger seat; and
   a retracting mechanism which is fastened to a bottom of said pasenger seat near the opposite side of said seat from said belt-turning member and retracts an end of said seatbelt extended underneath said seat, so that the axis of the portion of said seatbelt extending from said belt-turning member to said retracting mechanism is obliquely oriented with respect to the transverse axis of said vehicle.

2. A seatbelt system as defined in claim 1, wherein said belt-turning member is installed on a frame which is fastened to a reinforcement which is fastened to the passenger seat.

3. A seatbelt system as defined in claim 2, wherein said seatbelt is turned around one end of an arm which is rotatably supported on said frame.

4. A seatbelt system for a vehicle comprising:
   a passenger seat;
   a passenger-restraining seatbelt;
   a belt-turning member which is installed on the rear portion of one side of said passenger seat and around which an intermediate portion of said seatbelt is turned so that said seatbelt is extended underneath said seat, said belt-turning member being installed on a frame fastened to a reinforcement which is fastened to said passenger seat and including an arm which is rotatably supported on said frame, said arm including one end around which said seatbelt is turned around and the other end which acts as a pressing part whereby, said seatbelt is allowed to pass freely between said pressing part and said frame under ordinary conditions, and said seatbelt is clamped between said pressing part and said frame when said arm is caused to rotate by an increase in the tension on said seatbelt; and
   a retracting mechanism which is fastened to a bottom of said passenger seat near the opposite side of said seat from said belt-turning member and retracts an end of said seatbelt extending underneath said seat, so that the axis of the portion of said seatbelt extending from said belt-turning member to said retracting mechanism is obliquely oriented with respect to the transverse axis of said vehicle.

5. A seatbelt system as defined in claim 4, wherein the pressing part of the arm is driven in a direction which separates it from the frame so that a space for the passage of the seatbelt if formed.

6. A seatbelt system as defined in claim 1, wherein there is an angle of 15° to 45° between the transverse axis of the vehicle and the major axis of the portion of the seatbelt extending from the belt-turning member to the retracting mechanism.

7. A seatbelt system as defined in claim 1, wherein that said belt-turning member turns the seatbelt so that the line around which said seatbelt is turned is horizontal.

8. A seatbelt system as defined in claim 1, wherein a retractor shaft which power-retracts the seatbelt is installed in the retracting mechanism and the axis of said retractor shaft is horizontally oriented.

* * * * *